Jan. 26, 1937.　　　　F. C. FRANK　　　　2,068,947
WHEEL
Filed Oct. 2, 1933　　　2 Sheets-Sheet 1

INVENTOR.
Frederick C. Frank
BY Jerome R. Cox
ATTORNEY.

Jan. 26, 1937. F. C. FRANK 2,068,947
WHEEL
Filed Oct. 2, 1933 2 Sheets-Sheet 2

INVENTOR.
Frederick C. Frank
BY Jerome R. Cox
ATTORNEY.

Patented Jan. 26, 1937

2,068,947

UNITED STATES PATENT OFFICE 2,068,947

WHEEL

Frederick C. Frank, South Bend, Ind., assignor to Bendix Aviation Corporation, South Bend, Ind., a corporation of Delaware Application October 2, 1933, Serial No. 691,753

3 Claims. (Cl. 152—20)

This invention relates to wheels and to methods of forming them. It is illustrated by several forms of two piece tail wheels for airplanes.

One of the objects of the invention is economy in the production of wheels.

A further object is the provision of a sturdy rim on which the tire of the wheel may be permanently secured.

A feature of the invention is a rim formed originally in two parts which are subsequently permanently secured to each other and to the tire by being welded together within the tire.

Further objects and features of the invention should be apparent after a reading of the subjoined specification and claims and after consideration of the accompanying drawings, in which:

Figure 1:
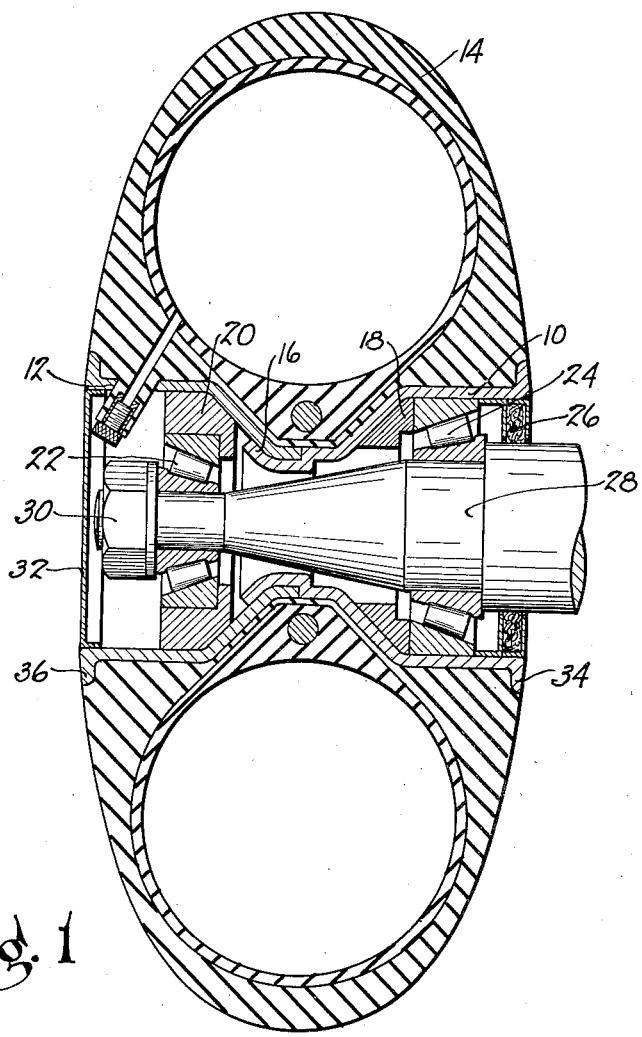
Figure 1 is a sectional view of a tail wheel of an airplane constructed according to my invention.

Referring particularly to the drawings, I have shown in Figure 1 a tail wheel including a rim of aluminum alloy formed of two sections 10 and 12 which after insertion of the tire 14 are permanently swaged or welded together as shown at 16 and thus become to all intents and purposes an integral rim permanently secured to the tire.

Into this rim are inserted bearing spacers 18 and 20, both being utilized for gripping the sections of the rim together and the latter also forming the seat for a bearing 22. Bearings 22 and 24 are then inserted. Dust washer 26 is then put in place on the stub axle 28 and the wheel assembly is held in position by the nut 30, after which the cap 32 is forced into place and the wheel is ready for service.

The rim flanges 34 and 36 serve as stiffeners to hold the rim circular and assist in holding the tire onto the rim.

The whole assembly is of economical construction and as the rim is comparatively inexpensive it can be permanently assembled in the tire and thrown away if the tire becomes useless in service.

Figure 2:
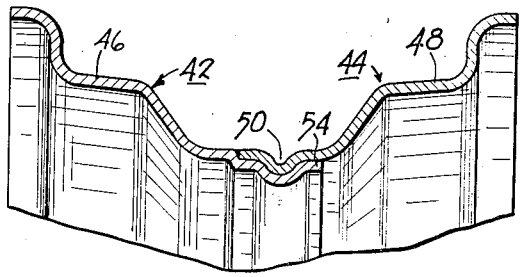
Figure 2 is a fragmentary sectional view of a modified form of rim.
Figure 3:
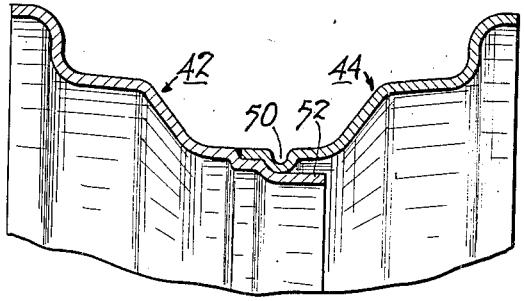
Figure 3 is a view similar to Figure 2 showing the parts of the rim before joining.

The aluminum alloy rim shown in Figures 2 and 3 is made up of two halves 42 and 44 each made as a stamping. Each half is continuous and thus can be held to a definite circumference at the tire seats 46 and 48. The groove 50 is formed in the section 44 before assembly, but the corresponding groove is only partially formed in the section 42, as may be seen at 52. At assembly the lock is completely formed by bending up the edge of the section 42 as shown at 54 at the same time that the two halves are welded together.

This construction makes a thoroughly practical and safe rim, even if the welding is not perfect.

Figure 4:
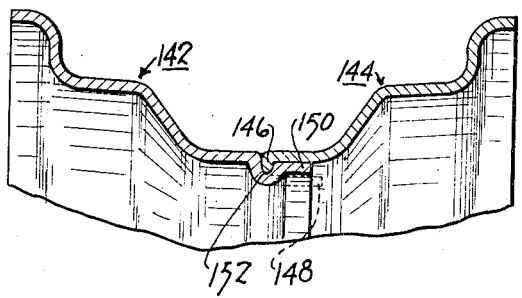
Figure 4 is a view similar to Figure 2 showing a modified form of rim.

In the construction shown in Figure 4, the section 144 is originally formed with a flange 146, while the section 142 is formed as shown by the dotted lines 148. At the time of welding the edge 150 is bent up to form the groove 152 which locks with the flange 146.

It is to be understood that the above described embodiments are for the purpose of illustration only and various changes may be made therein without departing from the spirit and scope of the invention.

I claim:

1. A streamlined tail wheel for an airplane having two interengaging annular members, a tire, a radially extending flange at one end of each of the annular members designed to engage a portion of the tire, a section of reduced diameter at the other end of each of the annular members, a portion of one of the annular members being of lesser diameter than the corresponding portion of the other member, the portion of lesser diameter being of suitable length to project through the portion of larger diameter and enlarged into engagement therewith to securely fix the two annular members together, a stub axle, and means between the axle and the annular members to transmit force from the wheel to the axle and to urge the annular members of the wheel toward each other with a force proportional to the force exerted upon the axle.

2. A streamlined tail wheel for an airplane having two interengaging annular members, a stub axle, anti-friction means between the axle and wheel, a tire, a radially extending flange at one end of each of the annular members designed to engage a portion of the tire, a section of reduced diameter at the other end of each of the annular members, a portion of one of the annular members being of lesser diameter than the corresponding portion of the other member, the portion of lesser diameter being of suitable length to project through the portion of larger diameter and being enlarged into abutment therewith, and means engaging each of the annular members to support the anti-friction means.

3. An integral streamlined wheel and tire assembly having two interengaging annular members, a tire having a metallic bead, a radially extending flange at one end of each of the annular members designed to engage the side walls of the tire, a section of reduced diameter at the other end of each of the annular members, a portion of one of the annular members being of lesser diameter than the corresponding portion of the other member, the portion of lesser diameter being of suitable length to project through the portion of larger diameter and turned into abutment therewith, an axle, anti-friction means between the wheel and axle, a cover plate adapted to close the outer end of one of the annular members, and packing means adapted to engage the axle and the outer end of the other of the annular members.

FREDERICK C. FRANK.